United States Patent [19]

McIntyre

[11] Patent Number: 4,757,964
[45] Date of Patent: Jul. 19, 1988

[54] METHOD FOR CONTROLLING THE ATTITUDE OF A SPINNING BODY IN ORBIT

[75] Inventor: John E. McIntyre, Los Alamitos, Calif.

[73] Assignee: Hughes Aircraft Company, Los Angeles, Calif.

[21] Appl. No.: 886,481

[22] Filed: Jul. 17, 1986

[51] Int. Cl.$^4$ ................................................ B64G 1/24
[52] U.S. Cl. ...................................... 244/164; 364/459
[58] Field of Search .................... 244/158 R, 164, 165; 364/459

[56] References Cited

U.S. PATENT DOCUMENTS 3,271,565 9/1966 Blackman ............................ 244/164

OTHER PUBLICATIONS

R. Gluck, "Exploiting Environmental Torques for Attitude Control and Determination of Spin Stabilised Satellites," Israel Journal of Technology, (Jerusalem, Israel), vol. 12, No. 3-4, 1974, pp. 151-159.
W. Eversman, "Dynamics of a Slowly Spinning Satellite in a Regressing Orbit," Journal of Spacecraft, (New York), vol. 3, No. 4, Apr. 1966, pp. 531-537.

Primary Examiner—Galen Barefoot
Attorney, Agent, or Firm—S. M. Mitchell; M. J. Meltzer; A. W. Karambelas

[57] ABSTRACT

A method for passively stabilizing the attitude of a spinning orbiting body subject to orbital precession to maintain the spin axis orientation of the body essentially fixed and stable relative to the orbital plane. The preferred embodiment comprises selecting a body mass geometry and orbital parameters, including an orbit inclination, an orbital rate and a rate of regression of orbit line of nodes, so that the precessional motion of the body and the orbit are equal and opposite in direction and locating the spin axis of the body in a plane containing the north axis of the body and the orbit normal and between the north axis and the orbit normal, so that the gravity gradient precession of the spin axis equals the regressional motion of the orbit normal to produce a planar equilibrium configuration.

6 Claims, 2 Drawing Sheets

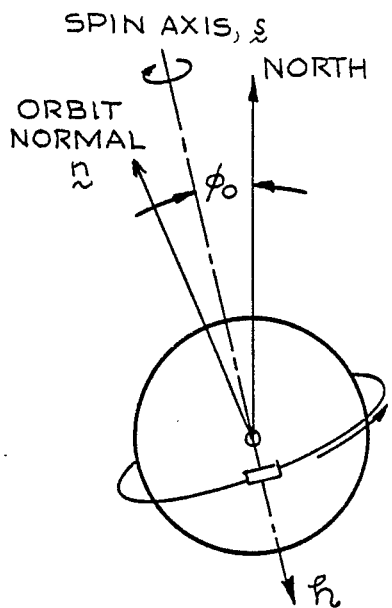
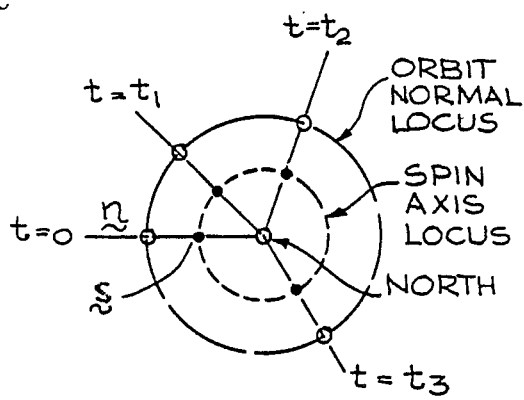
*Fig. 1A*  *Fig. 1B*
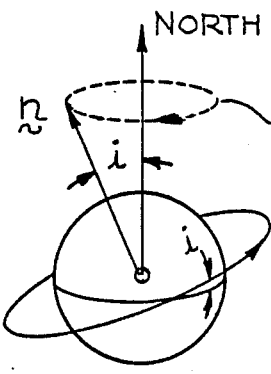
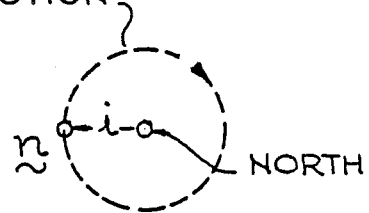
*Fig. 2A*  *Fig. 2B*
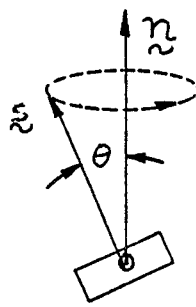
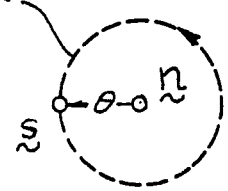
*Fig. 3A*  *Fig. 3B*

METHOD FOR CONTROLLING THE ATTITUDE OF A SPINNING BODY IN ORBIT

BACKGROUND OF THE INVENTION

1. Field of the Invention

This invention relates to spin axis stabilization of a spinning orbital body and, more particularly, to a method of stabilizing a spinning orbiting body without resort to active stabilizing mechanisms.

2. Description of Related Art

In previously known methods of attempting to stabilize the orientation of a spinning orbital body, such as a satellite, various active means are generally employed. The most common of these means is the use of thrusters using some form of mass expulsion to produce attitude control moments which interact with the subject body mass and geometry to produce the desired precession of the spin axis of the body to maintain a stable attitude orientation.

Another stabilization method found in the prior art is the use of electrical energy or magnetic fields to produce magnetic moments which react with the earth's magnetic field to produce control torques for precessing the spin axis of the orbital body.

Thus, to create and maintain the desired control torque moments, these known prior art methods require additional complexity, weight and energy consumption that lessen the useful payload and efficiency of the orbiting body for its designed mission.

While these known prior art methods are acceptable for relatively short-lived orbital bodies and missions, where the necessary trade-off of weight, complexity and energy consumption may be feasible, the present goals of establishing a permanent orbiting body, such as an earth orbiting space station, present unique demands on payload weights and overall system efficiency requiring new stabilization methods and systems that will result in greater reliability and dependability of operation at reduced levels of weight, complexity and energy consumption.

Accordingly, each of these previously known methods has a number of disadvantages which are overcome in the practice of the present invention. Specifically, the desired orientation of the body may be produced without the use of thrusters or mass expulsion, thus eliminating the need to carry attitude control fuel or propellant on the orbiting body. The desired orientation of the body may also be produced without the expenditure of electrical energy or the development of magnetic fields of any kind, thus greatly reducing the energy requirements of the orbiting body. The desired orientation of the body may be produced without the need for attitude sensing devices to produce control system error signals, thus providing for reduced cost and improved reliability. Finally, as a result of the system design and configuration embodied in the method of this invention, the desired attitude of the spinning body may be passively maintained, and the maximum excursion of the sun angle from the equatorial plane of the spinning body may be kept suitably small for solar array efficiency.

SUMMARY OF THE INVENTION

The present invention provides a method to passively stabilize a spinning body in a fixed orientation designed to satisfy the aforementioned needs of reduced weight, complexity and energy consumption. This invention embodies a unique method of choosing the vehicle body mass geometry, spin rate, orientation and orbit in a prescribed fashion. The orbit does not have to be equatorial, or the attitude orientation normal to the orbit plane. Furthermore, the method of the invention allows passive maintenance of the desired attitude of the spinning body, and the maximum excursion of the sun angle from the equatorial plane of the spinning body may be kept suitably small for solar array efficiency or antenna gain.

Accordingly, the present invention relates to a method for passively stabilizing the attitude of a spinning orbiting body having as its orbital parameters an orbit inclination i, an orbital rate $\Omega_o$ and a rate of regression of the orbit line of nodes $\gamma$, so that the spin axis orientation angle $\phi_o$ of the body remains essentially fixed and stable relative to the orbital plane of the body, even when the orbit of the body is precessing. The axis orientation $\phi_o$ is the angle of the spin axis from polar north in the plane formed by north and the orbit normal.

This method comprises selecting a mass geometry $\sigma$ for the body defined by the ratio of the body's spin inertia to the body's transverse inertia; selecting a spin rate $\Omega$ for the body so that the spin orientation angle $\phi_o$ for the body is an equilibrium solution to the following relationship:

$$\phi_o = \arctan\left(\frac{z_o}{y_o}\right) + i - \pi/2$$

where, for an xyz orbital coordinate system having z along the orbit normal axis and x at the ascending node, the following relations hold:

$$x_o = 0$$

$$y_o = \frac{z_o \sin i}{\cos i - kz}$$

with $z_o$ being a solution to the quartic:

$$k^2 z_o^4 - 2k \cos i\, z_o^3 + (1-k^2) z_o^2 + 2k \cos i\, z_o - \cos^2 i = 0$$

and k being a constant defined by the following expression:

$$k = 1.5\left(\frac{\sigma - 1}{\sigma}\right)\frac{\Omega_o^2}{\Omega \dot\gamma}$$

and initially orienting the body in orbit with spin orientation angle $\phi_o$. The quantities $x_o$, $y_o$ and $z_o$ which define the orientation angle $\phi_o$ are the components in the xyz system of a unit vector along the body spin axis.

BRIEF DESCRIPTION OF THE DRAWINGS

A better understanding of the present invention may be gained from a consideration of the following detailed description, taken in conjunction with the accompanying drawings in which:

FIG. 1A is a diagram illustrating the relationship of an orbiting body such as a satellite whose spin axis attitude is passively maintained in accordance with the present invention;

FIG. 1B is a diagram similar to that of FIG. 1A from a top plan view illustrating relative positions of the spin axis and the orbit normal at different times;

FIG. 2A is a diagram illustrating the change in satellite orientation resulting from the regressional motion of the orbit normal which is produced by the earth's oblateness;

FIG. 2B is a diagram similar to that of the diagram in FIG. 2A from a top plan view;

FIG. 3A is a diagram illustrating the regressional motion of the spin axis of a satellite;

FIG. 3B is a diagram similar to that of the diagram in FIG. 3A from a top plan view;

DESCRIPTION OF THE PREFERRED EMBODIMENT

Figure 4:
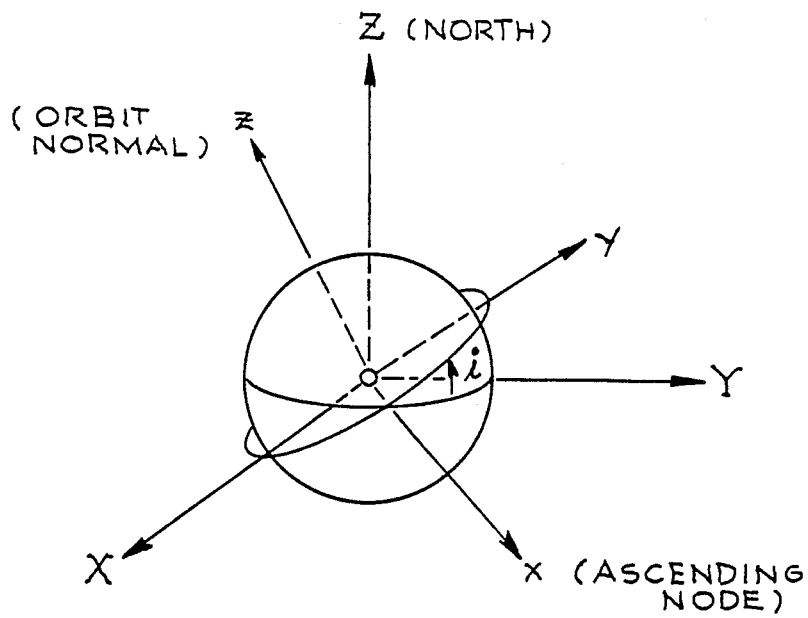
FIG. 4 is a diagram illustrating the coordinate system definition employed in the description herein.

The essence of this invention lies in the design of the orbiting body mass properties (body inertia and geometry), the production of the particular spin rate, and a unique initial orientation of the body in orbit such that the ensuing inertial motion of the spin axis continuously and passively follows the motion of the precessing orbit plane while also limiting the total excursion of the sun line from the equatorial plane of the spinning body. This unique arrangement of system elements accounts for the basic system diagram of FIGS. 1A and 1B.

As illustrated in FIGS. 1A and 1B, the spin axis is fixed in the plane defined by the earth polar axis and the orbit plane normal, and at a fixed angle $\phi_o$ with respect to north. If the spin axis is placed in this position initially, it will remain there indefinitely, even though the orbit itself is precessing, provided the angle $\phi_o$ is correctly chosen. Furthermore, the spin axis orientation is stable in that small errors in the initial placement remain small indefinitely. Thus, the spin axis is passively maintained in a fixed position in the earth axis/orbit plane without recourse to fuel or energy expediture, provided it is placed at the correct initial angle, $\phi_o$, to begin with. This angle $\phi_o$ is a function of two parameters i and k, as defined in the following relationship:

$i$ = orbit inclination $$k = 1.5 \left( \frac{\sigma - 1}{\sigma} \right) \frac{\Omega_o^2}{\Omega \dot{\gamma}}$$

where $$\sigma = \frac{\text{(vehicle spin inertia)}}{\text{(vehicle transverse inertia)}}$$

$\Omega_o$ = orbital rate
$\Omega$ = spin rate
$\gamma$ = rate of regression of orbit line of nodes.

It is important in practicing the method of the present invention to select the mass geometry of the body and the spin rate ($\sigma$ and $\Omega$, respectively) consistent with the desired orbital parameters referenced above (i, $\Omega_o$, and $\gamma$) so that the angle $\phi_o$ is small enough to provide adequate solar cell power over the mission life; and then to place the vehicle's spin axis in the correct orientation at the start of the mission.

In a preferred embodiment of the method of the invention, the spin axis orientation angle $\phi_o$ may be determined as follows. For a vehicle in an orbit which is inclined with respect to the equatorial plane, the oblateness of the earth causes the orbit normal to precess about the north/south axis in a retrograde sense. This regressional motion is shown in FIGS. 2A and 2B. In addition, gravity gradient torques across the body cause the spin axis of the vehicle to precess about the orbit normal in a positive sense if the body is rod-shaped, that is, having a roll-to-pitch ratio less than unity, and in a retrograde sense if the body is disk-shaped. The motion for the disk-shaped case is illustrated in FIGS. 3A and 3B.

These two precessions will generally cause the spin axis of the vehicle to wander over large regions of the sky unless mass and/or energy are expended to counteract these forces.

An alternative approach, and the fundamental principle of the method of the present invention, is to size the vehicle and orbit parameters so that the precessional motions combine favorably to allow passive maintenance of the spin axis attitude in the useful, known orientation illustrated in FIGS. 1A and 1B. This favorable combination is achieved by locating the spin axis between the north axis and the orbit normal at a position such that the gravity gradient precession of the spin axis is just balanced by the regressional motion of the orbit normal to produce the planar equilibrium configuration as illustrated in FIGS. 1A and 1B.

To derive the method of the invention mathematically, consider a rotating xyz orbital coordinate system as illustrated in FIG. 4 with z along the orbit normal axis and x at the ascending node. The angular rate $\omega$ of this system with respect to the celestial XYZ system is $$\underline{\omega} = -\dot{\gamma} \begin{pmatrix} 0 \\ \sin i \\ \cos i \end{pmatrix} \quad (1)$$

with the equations of motion for the vehicle angular moment vector h satisfying the relation $$\frac{d\underline{h}}{dt} + \underline{\omega} \times \underline{h} = \underline{T}_G \quad (2)$$

where $T_G$ = gravity gradient torque.

Since the gravity disturbance torque is small and requires long time intervals to move the h vector appreciably, it is replaced by its average value over an orbit to yield the governing equations of motion for the system: (Equation 3)

$$\begin{pmatrix} \dot{h}_x \\ \dot{h}_y \\ \dot{h}_z \end{pmatrix} = - \frac{3\Omega_o^2}{2h^2} (C - A) h_z \begin{pmatrix} -h_y \\ h_x \\ 0 \end{pmatrix} + \dot{\gamma} \begin{pmatrix} h_z \sin i - h_y \cos i \\ h_x \cos i \\ -h_x \sin i \end{pmatrix}$$

where C is the vehicle spin inertia and A is the transverse inertia about the vehicle center of gravity.

Letting u denote the unit vector, $$u = \begin{pmatrix} x \\ y \\ z \end{pmatrix} = \frac{1}{h} \begin{pmatrix} h_x \\ h_y \\ h_z \end{pmatrix} \quad (4)$$

The above equation can be rewritten:

$$x' = (kz - \cos i) y + z \sin i \quad (5)$$
$$y' = (\cos i - kz) x$$
$$z' = -x \sin i$$

where:

$$' = \frac{d}{d\psi}, \psi = \dot{\gamma} t$$

$$k = 1.5 \left( \frac{\sigma - 1}{\sigma} \right) \frac{\Omega_o^2}{\Omega \dot{\gamma}}$$

and $\sigma = \frac{C}{A}$

These expressions (5) have the two first integrals, $$x^2 + y^2 + z^2 = 1 \quad (6)$$

$$y = \frac{kz^2}{2 \sin i} - z \cot i + C_1$$

and the equilibrium solution $$x_o = 0 \quad (7)$$
$$y_o = \frac{z_o \sin i}{\cos i - kz}$$

with $z_o$ a solution to the quartic relation, $$k^2 z_o^4 - 2 k \cos i \, z_o^3 + (1-k^2) z_o^2 + 2 k \cos i \, z_o - \cos^2 i = 0 \quad (8)$$

The equilibrium spin angle $\phi_o$ is then determined from the equilibrium solution, $$\phi_o = \arctan \left( \frac{z_o}{y_o} \right) + i - \pi/2 \quad (9)$$

The dependence of $\phi_o$ on the parameters i and k is evident in the form of the equilibrium solution to Equations (7), (8) and (9). That the solution is stable follows from the first integral expressions in Equation (6) above which show the motion of the spin axis to be on the intersection of the unit sphere and a parabolic cylinder. For the equilibrium solution, this intersection is a single point. This closed contour behavior demonstrates the stability of the equilibrium motion described by this set of equations.

To illustrate the concept, consider a large space station which is to be placed in a 500 kilometer orbit inclined at an angle of 28.5°. For such an orbit, the nodal regression rate is 6.72° per day and the orbital period of 94.13 minutes. Let the vehicle have a dual spinner construction consisting of a large rotor, which is spun to provide both gyroscopic stiffness and a spinning gravity environment, and a despun zero gravity section.

Figure 5:
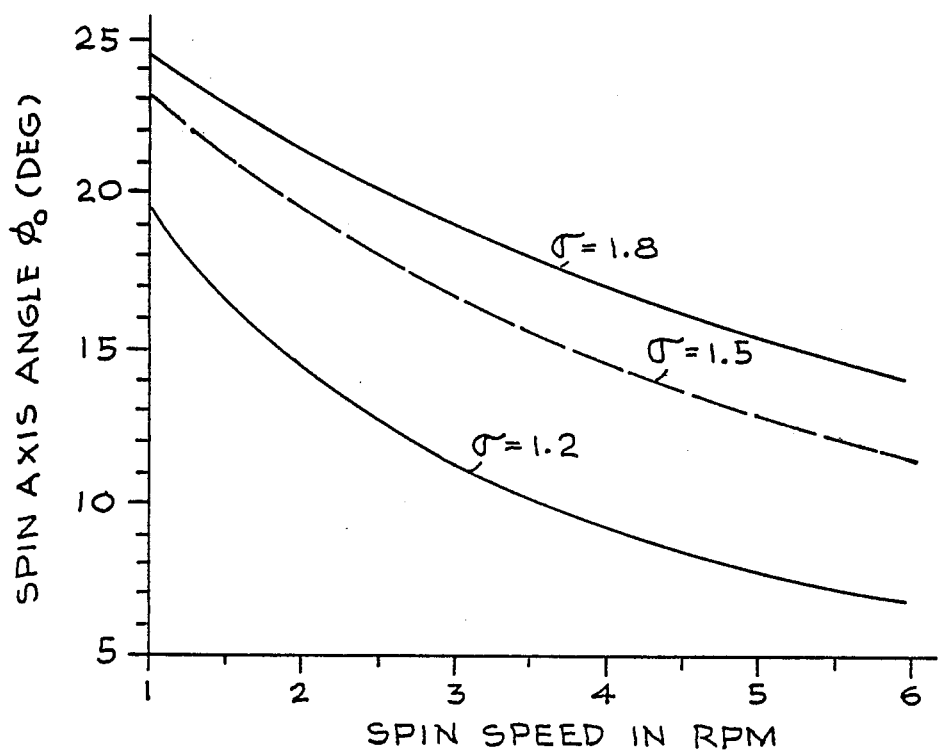
FIG. 5 is a graph of the equilibrium spin axis angle $\phi_o$ as a function of spin speed for a space station application having an orbit altitude of 500 km and inclination of 28.5°.

FIG. 5 illustrates the critical angle $\phi_o$ for spin rates from one to six revolutions per minute and for values of vehicle inertia ratios $\sigma$ ranging from 1.2 to 1.8. For the dual spin application, $\sigma$ is the ratio of the rotor spin inertia to the vehicle transverse inertia. Since small values of $\phi_o$ are desired for power purposes, higher spin rates and lower $\sigma$ values are preferred for this application. Hence the spacecraft designer would size the rotor mass properties and spin rate to generate an acceptable spin axis angle $\phi_o$ for such an objective.

The method of the invention applies to both spinning and dual spinning spacecraft. In the latter case, however, the vehicle spin inertia must be replaced by the rotor spin inertia in determining the spin axis orientation angle $\phi_o$.

Also it will be noted from the equilibrium condition of Equations (7), (8) and (9) that there can exist as many as four orientation angles $\phi_o$ for each orbit and spacecraft. Generally, the smallest $\phi_o$ value is of most interest because of power considerations. However, the other angle solutions can be used to provide similar spin axis maintenance.

Thus, there has been described a method for passively maintaining the attitude of a spinning orbiting body having as its orbital parameters an orbit inclination, an orbital rate and a rate of regression of orbit line of nodes, so that the spin axis orientation angle of the body remains essentially fixed and stable relative to the orbital plane of the body, even when the orbit of the body is precessing, to provide optimum antenna gain and optimum solar cell illumination. By using the method of the invention of passive stabilization to orient the satellite, the penalties in weight, complexity, and energy consumption existing in conventional active stabilization systems of the prior art have been minimized.

Although there have been described above specific arrangements of a method for controlling the attitude of a spinning body in orbit in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A method of passively stabilizing the attitude of a spinning earth-orbiting body having as its orbital parameters an orbit inclination i, an orbital rate $\Omega_o$ and a rate of regression of orbit line of nodes $\gamma$, so that the spin axis orientation angle $\phi_o$ of said body remains essentially fixed and stable relative to the orbital plane of said body, even when the orbit of said body is precessing, which comprises:

selecting a mass geometry $\sigma$ for said body defined by the ratio of said body's spin inertia to said body's transverse inertia;

selecting a spin rate $\Omega$ for said body so that said spin axis orientation angle $\phi_o$ for said body is an equilibrium solution to the following relationship $$\phi_o = \arctan \left( \frac{z_o}{y_o} \right) + i - \pi/2$$

where for an xyz orbital coordinate system having z along the orbit normal axis and x at the ascending node $$x_o = 0$$

$$y_o = \frac{z_0 \sin i}{\cos i - kz}$$

$i$ = orbit inclination $$k = 1.5 \left( \frac{\sigma - 1}{\sigma} \right) \frac{\Omega_o^2}{\Omega \dot{\gamma}}$$

and $z_o$ is a solution to the quartic $$k^2 z_o^4 - 2k \cos i\, z_o^3 + (2-k^2) z_o^2 + 2k \cos i\, z_o - \cos^2 i = 0$$

and initially orienting said body in orbit with said spin axis orientation angle.

2. The method of claim 1 wherein the spin axis of said body is located in a plane defined by the polar axis of the earth and the orbit plane normal of the body.

3. The method of claim 2 wherein the spin axis of the body is oriented between polar north and the orbit normal.

4. A method of passively stabilizing the attitude of a spinning earth-orbiting body which is precessing, the method serving to maintain the spin axis orientation of said body essentially fixed and stable relative to the orbital plane of said body, even when the orbit of said body is also precessing, the method comprising:
  selecting a body mass geometry and orbital parameters comprising an orbit inclination, an orbital rate and a rate of regression of orbit line of nodes so that the precessional motions of said body and said orbit are equal and opposite in direction;
  locating the spin axis of said body in a plane defined by the earth polar axis and the orbit normal of the body and between said polar axis and said orbit normal; and
  selecting the spin axis angle so that the gravity gradient precession of said spin axis equals the regressional motion of the orbit normal to produce an axis equilibrium configuration.

5. The method of claim 4, further including the step of initially orienting said body in orbit with said spin axis angle.

6. An earth orbiting system in which a spinning satellite is located in orbit about the earth, the system comprising:
  a spinning orbiting body having a mass geometry defined by the ratio of the body's spin inertia to the body's transverse inertia and a selected spin rate consistent with desired orbital parameters satisfying the following definitions:

$i$ = orbit inclination $$k = 1.5 \left( \frac{\sigma - 1}{\sigma} \right) \frac{\Omega_o^2}{\Omega \dot{\gamma}}$$

where $$\sigma = \frac{\text{(vehicle spin inertia)}}{\text{(vehicle transverse inertia)}}$$

$\Omega_o$ = orbital rate
$\Omega$ = spin rate
$\dot{\gamma}$ = rate of regression of orbit line of nodes
and wherein the spin axis of the orbiting body is at an angle $\phi_o$ defined as:

$$\phi_o = \arctan\left(\frac{z_o}{y_o}\right) + i - \pi/2$$

where, for an xyz orbital coordinate system having z along the orbit normal axis and x at the ascending node, the following relations hold:

$$x_o = 0$$

$$y_o = \frac{z_0 \sin i}{\cos i - kz}$$

and $z_o$ is a solution to the quartic $$k^2 z_o^4 - 2k \cos i\, z_o^3 + (1-k^2) z_o^2 + 2k \cos i\, z_o - \cos^2 i = 0.$$

* * * * *